R. G. GASKILL.
AUTOMOBILE HEADLIGHT TURNING DEVICE.
APPLICATION FILED MAR. 9, 1911.
1,014,627.
Patented Jan. 9, 1912.
2 SHEETS—SHEET 1.
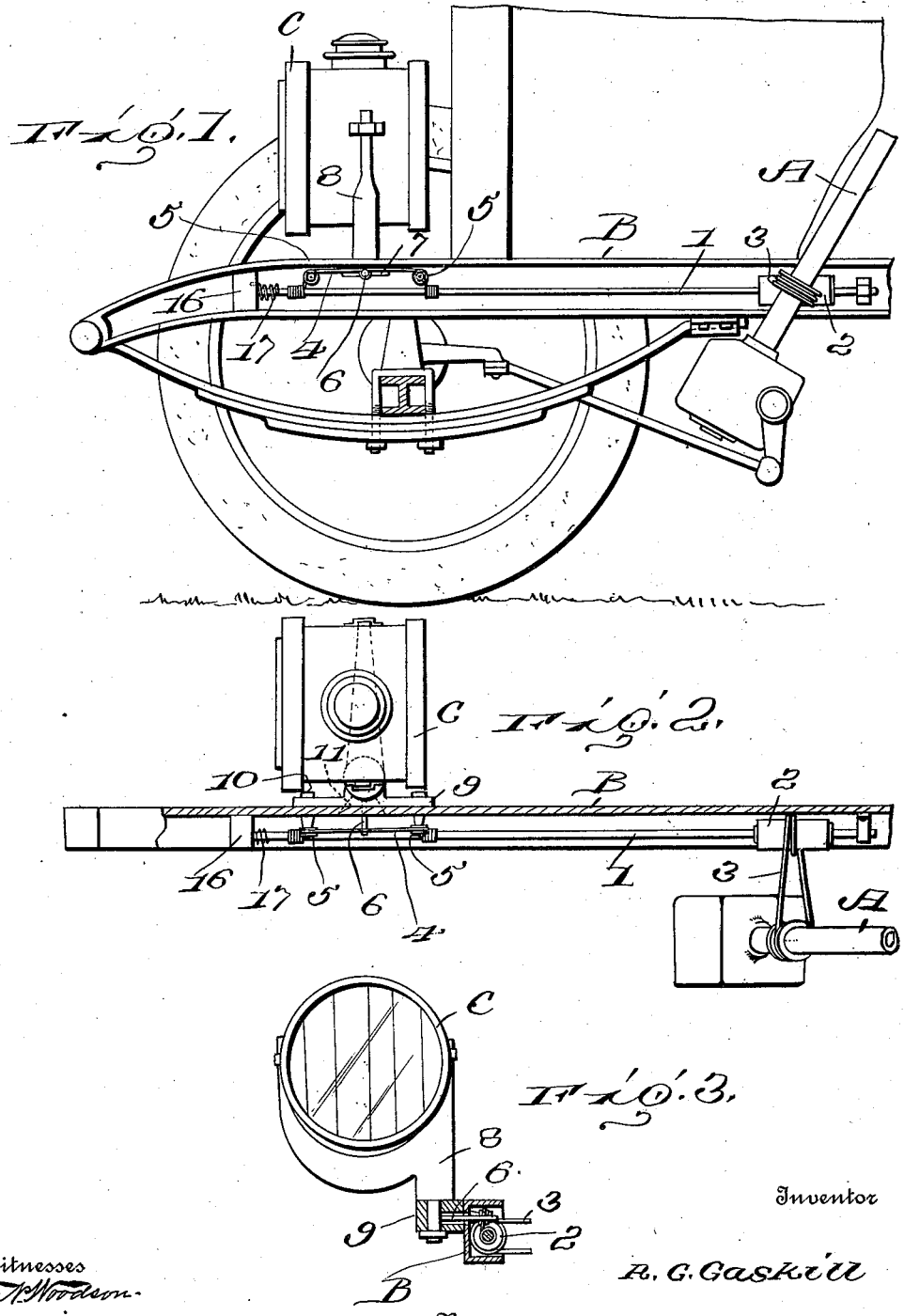

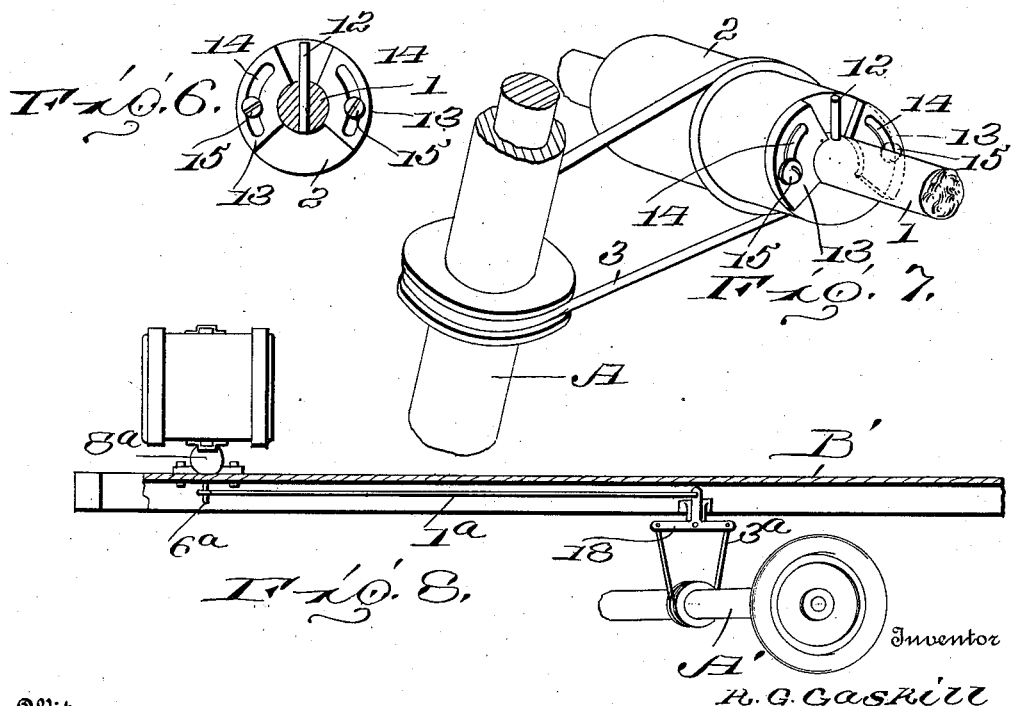

UNITED STATES PATENT OFFICE.

RAYMOND G. GASKILL, OF PORT DEPOSIT, MARYLAND.

AUTOMOBILE HEADLIGHT-TURNING DEVICE.

1,014,627.  Specification of Letters Patent.  Patented Jan. 9, 1912.

Application filed March 9, 1911. Serial No. 613,435.

*To all whom it may concern:*

Be it known that I, RAYMOND G. GASKILL, citizen of the United States, residing at Port Deposit, in the county of Cecil and State of Maryland, have invented certain new and useful Improvements in Automobile Headlight-Turning Devices, of which the following is a specification.

This invention comprehends certain new and useful improvements in automobile attachments or accessories, and relates particularly to devices for turning the automobile head-lights to the right or to the left, as required, under the control of the steering mechanism, as the vehicle rounds curves, in order that the beams of light may be properly maintained along the road.

The invention has for its primary object a simple, durable and efficient construction of automobile head-light turning mechanism, the parts of which may be easily manufactured, readily assembled, and susceptible of easy attachment to the framework of the automobile, where practically all of the parts will be entirely out of sight, and therefore detracting in no wise from the appearance of the machine.

The invention has for a further object an attachment of this character which will not be liable to get out of order and which will otherwise be an improvement over devices of this character heretofore constructed, and therefore more useful and commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a sectional side elevation illustrating one form or embodiment of my invention; Fig. 2 is a top plan view thereof, with one portion in section; Fig. 3 is a transverse sectional view; Figs. 4 and 5 are detail views of a drum employed; Fig. 6 is a transverse sectional view through the actuating rod, showing the end of the drum; Fig. 7 is a detail perspective view illustrating the connection between the drum and the steering post or pillar of the automobile; and, Fig. 8 is a top plan view of another embodiment of the invention hereinafter specifically described.

Corresponding and like parts are referred to in the following description and indicated in all the views of the drawings by the same reference characters.

Referring to the drawings, and now particularly to Figs. 1 to 7, inclusive, A designates the steering post of an automobile, B one of the reaches or side frame bars of the machine, and C a head light, all of these parts being of any desired or conventional design or construction and being selected for the purposes of illustration only.

In carrying out my invention, as regards the embodiment of the invention now being described, I employ a rod 1 which is mounted within the channel of one of the beams or frame bars B, the rod extending longitudinally of the frame bar, as shown, and being journaled therein to turn about its longitudinal axis. The rod 1 is provided at its rear end with a drum 2 around which a cable 3 extends, said cable also extending around the steering post A and being secured thereto, preferably, whereby as the post is turned under the control of the operator to guide the machine to the right or to the left, the drum 2 and shaft 1 will also be turned.

A cable 4 has its ends wound in opposite direction around the rod 1 near the forward end of the same, the cable 4 extending over guide pulleys 5 and being secured at an intermediate point in any desired way, to a crank arm 6 projecting laterally through a longitudinal slot 7 formed in the bar B. The arm 6 is secured to or forms a part of the lower end of a lamp supporting bracket or post 8, in which the head light C is mounted. The head light is secured in the bracket 8 in any preferred manner.

The bracket or post 8 extends vertically, as shown, and is mounted to turn in a socket formed in a casting or bracket 9 which is secured to the outer side of the bar B by bolts 10 or similar fastening devices, and preferably the same bolts that are used to secure the bracket 9 to the frame bar are used as the supports on which the pulleys or rollers 5 are journaled, as best illustrated in Fig. 2. The bracket 9 is formed on its inner side with a slot 11, the side walls of which are beveled, as shown, to permit the proper movement of the crank arm 6.

In the preferred construction and arrangement of parts, the drum 2 is mounted for a limited independent rotary movement on the rod 11, whereby an initial movement of the steering post may be made independently of any movement of the rod 1. In the present embodiment of the invention this result is accomplished by mounting the drum 2 loosely on the rod 1 and by securing to the rod a pin 12, as best illustrated in Figs. 4 to 7, inclusive, the pin being designed for engagement with the opposing edges of stop lugs 13 in the form of segmental plates, formed with slots 14 accommodating set screws 15 working in one end of the drum 2. It will thus be understood that the initial movement of the drum 2 transmitted from the steering post A is an independent one, until one of the plates or stop lugs 13 abuts against the pin 12, whereupon the independent movement of the drum 2 is ended and the rod 1 is caused to turn in the required direction. Preferably, the forward end of the rod 1 is journaled in a block 16 or other support in the channeled bar B, and a spring 17 is coiled around the rod, one end of the spring being secured to the rod and the other to the support 16, whereby the rod 1 will be brought back to a neutral position, as soon as relieved of the tension of the drum 2.

From as much of the description as has preceded, together with the correlated views of the accompanying drawings, the operation of this embodiment of my improved automobile head light turning attachment or mechanism will be apparent.

In the practical use of the device, it is, of course, to be understood that the lamp supporting bracket 8 on one side bar is connected to a corresponding and correspondingly mounted post on the opposite side frame bar, said connecting means being a rod or any other connection, not shown herein, as it is not deemed to be necessary for a thorough understanding of the invention. It is also to be understood that the turning attachment hereinbefore described is not duplicated for opposite sides of the machine, as the connecting rod or the like extending from one lamp supporting post to the other, avoids the necessity of a duplication of parts and tends to the simplification of the mechanism.

In describing the actual use of the device, it will be understood that as the post A is turned to the right or to the left, in order that the vehicle may round a curve for instance, the initial movement of the steering post will be an independent one, but will be finally transmitted from the drum 2 to the rod 1 and thence to the cable 4, which latter will be wound in one direction or the other upon the rod 1 and be moved longitudinally either forwardly or backwardly within the channel of said bar B, so as to turn the arm 6 to the rear or toward the front of the machine and correspondingly turn the post or supports for the head lights. It is to be particularly noted that all of the parts are hidden within the channel of the side bar to which they are connected, with the exception of the castings or brackets 9, these brackets and the connecting rod between the two supporting posts being the only parts that will show. Hence the appearance of the machine will not be detracted from and the characteristic of simplicity will be preserved, it being readily seen that as a matter of fact the only additional part to show at all is the connecting rod in the actual application of the invention, as the castings for the support of the lamp carrying forks or supports would be used in any event, either with or without the improved attachment herein described. Furthermore, it is to be noted that the only change in the structure of the automobile which will be necessitated by the application of my invention, is the relatively narrow slot 7 formed in the side bar, and it is clear that this will not materially weaken the framework of the machine.

It is to be understood that my invention is not limited specifically to the details of construction and arrangement and proportions of the parts shown in the accompanying drawing and hereinbefore or hereinafter described, as various changes may be made without departing from the scope of the invention as defined by the appended claims, and it is also to be understood that motion may be imparted from the steering post to the actuating rod of the device in any desired way, depending in some instances upon the peculiarities of the automobile with which it is desired to equip the invention. For instance, as illustrating another embodiment of the invention, reference is to be had to Fig. 8, wherein A' designates the steering post which is connected by a cable 3ª to the two oppositely extending alined arms of a three-armed lever 18, fulcrumed on the inner side of the side bar 3'. The third arm of this lever is pivotally connected to the rear end of an actuating rod 1ª lying in the channel of the frame bar and extending longitudinally thereof, the forward end of the actuating rod 1ª being in turn pivotally connected to a crank arm 6ª formed on or secured to the lower end of a lamp supporting post 8ª mounted similarly to the post 8 before described. Hence, it will be understood that as the steering post A' turns to the right or to the left to guide the machine, the three-armed lever 12 will be rocked so to push or pull upon the longitudinally extending actuating rod 1ª, thereby swinging the crank arm 6ª forwardly or rearwardly, as required. It is to be understood that in this embodiment of the invention, the lamp supporting post at one side of the machine is connected by a rod or the like, (not shown) to the corresponding part on the opposite side of the machine.

Having thus described my invention, what I claim as new is:—

1. The combination with the channeled side bar of a vehicle frame, said bar being formed with a longitudinally extending slot, of a lamp supporting post mounted to turn on the outer side of said bar and provided with a crank arm extending inwardly through said slot, an actuating rod mounted in the channel of said side bar and effectually concealed thereby, steering mechanism, and an operative connection between the steering mechanism and said actuating rod, whereby the latter will be turned upon the actuation of the former.

2. The combination with the side bar of a vehicle frame and the steering post of the vehicle, of an actuating rod supported by said bar and extending along the inner side thereof, the bar being formed with a longitudinal slot, a lamp supporting post journaled to turn about a vertical axis on the outer side of said bar and provided with a crank arm projecting inwardly through the slot and operatively connected to the forward end of the actuating rod, and a cable connection between the steering post and the actuating rod.

3. A light turning device, embodying an actuating rod, a drum loosely mounted thereon, means for imparting an initial movement to the drum independently of the rod and for subsequently compelling the simultaneous movement of the rod and drum, a lamp supporting post, a support in which said post is mounted to turn, and an operative connection between the post and rod.

4. A light turning device, embodying a rod mounted to turn about its longitudinal axis, means connected to said rod for yieldingly holding it in one position, means loosely mounted on the rod for turning the same, and means whereby the rod turning means will be permitted to have an initial movement on the rod independently thereof and a subsequent connection with the rod to turn the latter, a lamp supporting post, a support in which the post is mounted to turn, and an operative connection between said post and said rod.

5. A lamp turning device, embodying a post, a support in which the post is mounted to turn, a rod operatively connected to said post to turn the same, the rod being mounted to turn about its longitudinal axis, a drum loosely mounted on the rod, a pin with which the rod is provided, and stop lugs adjustably secured to said drum on opposite sides of said pin and designed to engage the same upon the turning of the drum, as and for the purpose set forth.

6. The combination with the side bar of a vehicle frame and the steering post of the vehicle, of an actuating rod supported by said bar and mounted to rotate about its longitudinal axis, a lamp supporting post journaled to turn about a vertical axis on the bar and provided with a crank arm, a cable connected to said crank arm and mounted to wind on said rod, and a cable connection between the steering post and rod.

In testimony whereof, I affix my signature in presence of two witnesses.

RAYMOND G. GASKILL. [L. S.]

Witnesses:
F. W. CLAPP,
JOHN W. GARNER.

---

Copies of this patent may be obtained for five cents each, by addressing the "Commissioner of Patents, Washington, D. C."